March 19, 1940.  F. H. MESSINGER  2,194,316
POWER SYSTEM FOR DRIVING SHAFTS
Filed June 11, 1938   2 Sheets-Sheet 1

WITNESSES

INVENTOR
Frederick H. Messinger
BY
Munn, Anderson & Liddy
ATTORNEYS

March 19, 1940.  F. H. MESSINGER  2,194,316
POWER SYSTEM FOR DRIVING SHAFTS
Filed June 11, 1938  2 Sheets-Sheet 2

INVENTOR
Frederick H. Messinger
BY
Munn, Anderson & Liddy
ATTORNEYS

WITNESSES

Patented Mar. 19, 1940

2,194,316

UNITED STATES PATENT OFFICE 2,194,316

POWER SYSTEM FOR DRIVING SHAFTS

Frederick H. Messinger, New York, N. Y.

Application June 11, 1938, Serial No. 213,159

2 Claims. (Cl. 60—54)

This invention relates to power systems for driving or rotating a shaft through the use of a liquid and a motor actuated thereby, an object being to provide a construction wherein a driven shaft may be operated at high speed.

Another object of the invention is to provide a power system for driving a shaft at several thousand revolutions per minute through the use of a turbine and liquid supplied thereto under desired pressure.

An additional object is to provide a power system using a turbine for driving a shaft and a power driven pump for circulating liquid through the turbine.

A further and more specific object is to provide a power system utilizing a turbine, a pump for pumping liquid to the turbine, a system for permitting circulation of the liquid through the pump and turbine, and means for eliminating any vibration commonly known as water hammering.

In the accompanying drawings—

Figure 1:
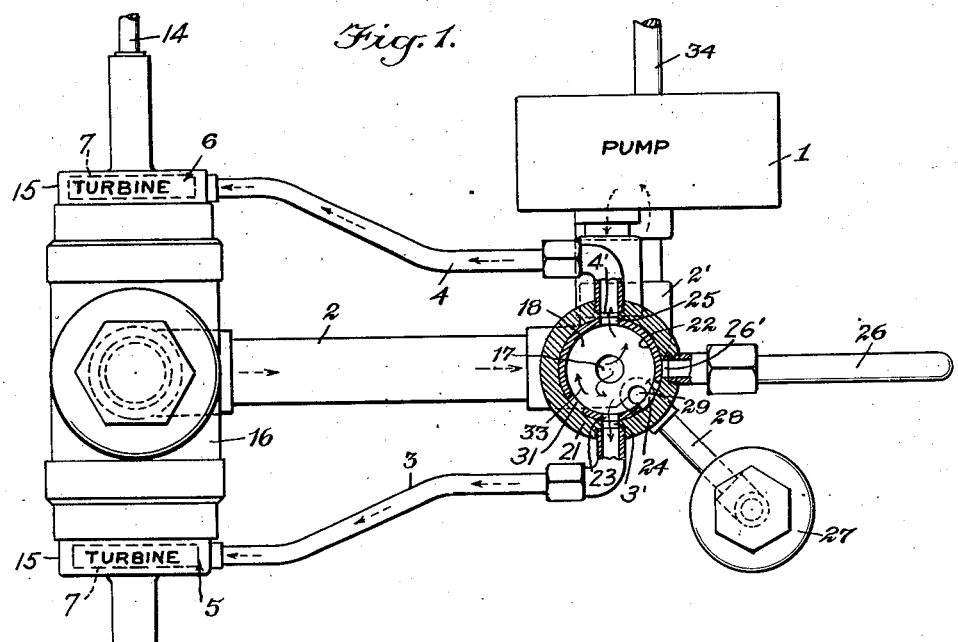
Fig. 1 is a plan view of a device disclosing an embodiment of the invention, a portion of the view being shown in section for better illustrating certain parts.

Referring to the accompanying drawings by numerals, 1 indicates a pump of any desired kind, as for instance a rotary pump. This pump is adapted to receive liquid from a large return pipe 2 to force the same through feed pipes 3 and 4 when both of these pipes are being used. The feed pipes 3 and 4 lead to the respective turbines 5 and 6 and supply liquid, for instance oil or water, to these turbines to cause the turbines to rotate. These turbines may be of any conventional kind whereby liquid entering through the pipe 3 for instance will enter into chamber 7 and pass through openings 8 and 9 into tapering discharge openings 10 and 11, whereby the liquid is directed at high speed against the buckets or blades 12 of a rotor 13. The rotor 13 is keyed or otherwise rigidly secured to a driven shaft 14. The construction just described is in connection with turbine 5 but it will apply equally to turbine 6.

Figure 2:
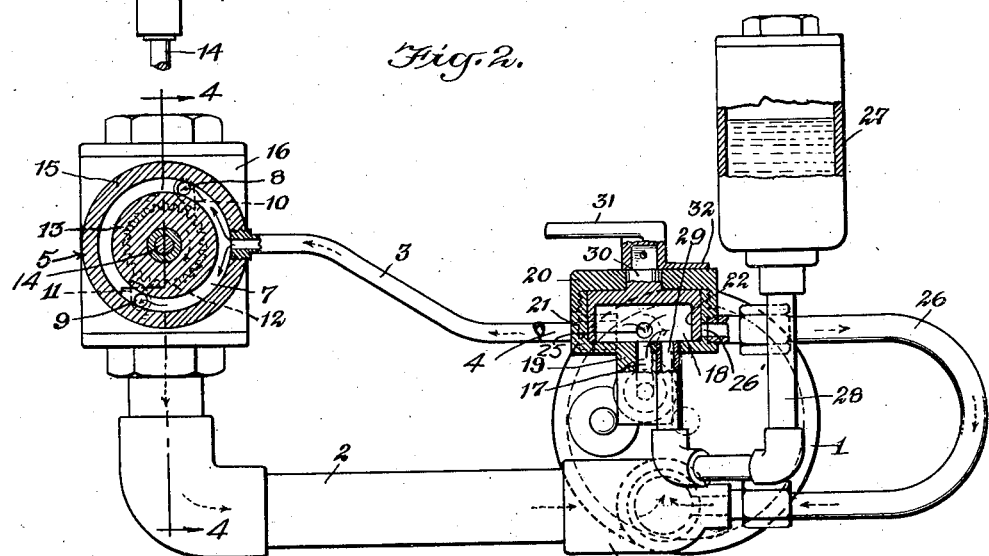
Fig. 2 is a side view of the structure shown in Fig. 1 with certain parts broken away and illustrated in section.
Figure 3:
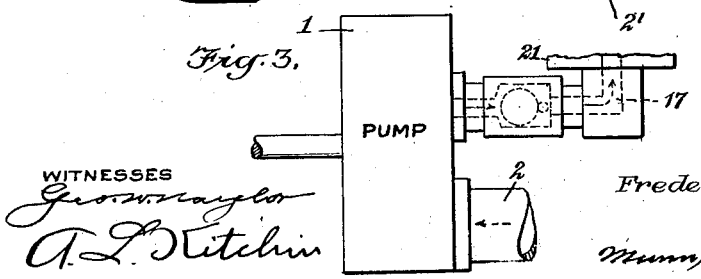
Fig. 3 is an end view of the pump and associated parts shown in Fig. 1.
Figure 4:
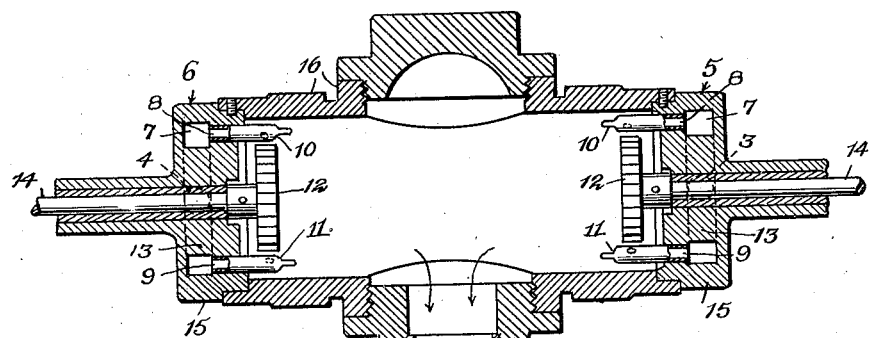
Fig. 4 is a sectional view through Fig. 2 approximately on the line 4—4.

The driven shaft 14 may extend through both turbines, as shown in Fig. 1, and be driven by both turbines, or this shaft could be divided so that each turbine will drive a separate shaft. It will be noted that these turbines are each provided with a casing 15 secured in any desired manner to a housing 16, which housing presents a chamber for receiving liquid discharged from the turbine. The return pipe 2 is in free communication with the chamber in housing 16 and when the parts are properly arranged as shown in Fig. 2, the liquid will quickly drop by gravity downwardly and usually maintain the pipe 2 filled. This pipe is connected with the inlet of the pump 1 which pump may be of any desired kind, as for instance the construction shown in my co-pending application Serial No. 211,315. The discharge from the pump 1 passes upwardly through a passageway 17 into a chamber 18. This chamber is really an enlargement of a tubular member 19 in which passageway 17 is located. A cap 20 is screwed on an enlargement or valve body 21 as shown in Fig. 2, which is provided with ports 3", 4' and 26'. A tubular valve member 22 is arranged in the chamber 18 and is provided with ports 3', 23, 24 and 25. These ports are properly spaced so that this valve member may control the flow of liquid into the pipes 3 and 4 or into the by-pass pipe 26, which serves to connect the chamber 18 with the inlet side of the pump 1. A closed container 27 is connected by a suitable pipe 28 to the bottom of the enlargement or valve casing 21 and opens into chamber 18, as illustrated at 29 in Figs. 1 and 2. It will be noted that the container 27 is always in free communication with the chamber 18 and, consequently, will prevent any so-called water hammering when the device is in use, as the air in the upper part of the chamber is confined and produces a desired cushioning action. The valve member 22 is provided with a stem 30 having a handle 31 whereby the valve member may be adjusted as desired. A pointer 32 is connected to handle 31 to indicate the relative position of the various ports in the valve member.

When the parts are in the position shown in Fig. 1 the ports are so positioned that liquid will move from the chamber 18 into both the pipes 3 and 4. It will also be noted that the inlet to the by-pass pipe 26 is closed. This pipe at the lower end is connected to a fitting 2' which connects pipe 2 with the inlet opening of the pump 1. It will therefore be seen that when pipe 26 is functioning it will discharge into member 2' and thence directly into the pump.

Figure 5:
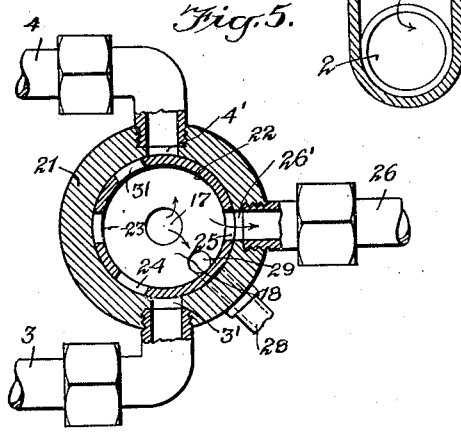
Fig. 5 is a sectional view through the valve shown at the right in Fig. 1 with the parts positioned to direct all of the fluid through the by-pass.
Figure 6:
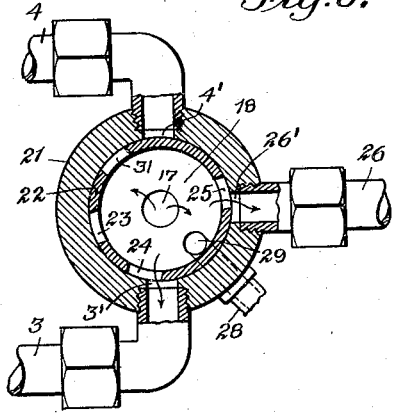
Fig. 6 is a view similar to Fig. 5 but showing the valve positioned to have approximately half of the fluid passing to the point of utilization and the other half through a by-pass.

If desired the valve member 22 could be rotated in the direction of the arrow 33 until the port 24 was opposite the inlet end of pipe 3. This would move port 25 away from the inlet end of pipe 4 and, consequently, liquid under pressure would be supplied to the turbine 5 only. By rotating the valve member 22 in the opposite direction to arrow 33 for a short distance, port 23 would come opposite the inlet of pipe 3 and port 24 would come opposite the inlet of the by-pass pipe 26. Port 25 could be moved out of registry with pipe 4 to the position shown in Fig. 6. Under these conditions the amount of fluid by-passed depends on the load on the turbine and the respective openings to by-pass 26 and pipe 3. As shown in Fig. 6 ports 24 and 25 are approximately half open to the pipes 3 and 26 respectively. The valve 22 could also be adjusted so that pipes 3 and 4 would be shut off completely, as shown in Fig. 5, whereupon all the fluid would be by-passed through pipe 26.

Figure 7:
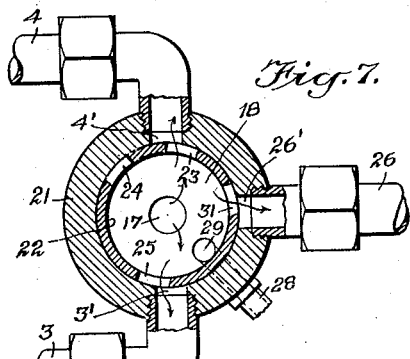
Fig. 7 is a view similar to Fig. 6 but showing the valve adjusted so that approximately one-third of the fluid will pass through the by-pass and one-third to each of two points of utilization.
Figure 8:
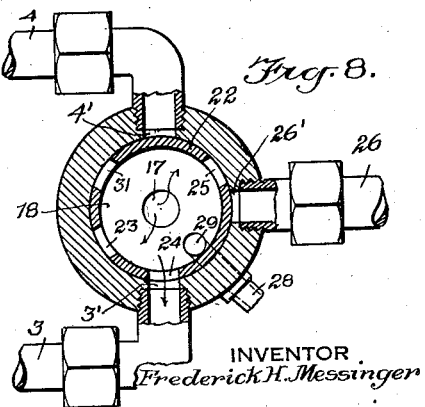
Fig. 8 is a view similar to Fig. 7 but showing an adjustment of the valve whereby all of the fluid is passing to a single point of utilization.

When the parts are adjusted as just described and the pump 1 is still functioning all the liquid would return through pipe 26 and neither of the turbines would be supplied with liquid. Also the valve member 22 could be adjusted to a position so that any desired portion of liquid could be caused to pass through either pipe 3 or 4, or both of these pipes and the pipe 26 as illustrated particularly in Figs. 6 and 7. It will be evident that if desired one of the turbines could be completely eliminated and in that case the pipe associated therewith would be eliminated.

The pump 1 is driven by a suitable drive shaft 34 which may be electrically connected with an electric motor or other suitable prime mover and may be rotated at any desired speed, as for instance 1800 revolutions per minute. This arrangement will cause the liquid to enter the openings or jets 10 and 11 at high pressure and at some considerable speed. By spacing the outlet end of the jets 10 and 11 from the buckets 12 the inertia or speed of the discharged liquid will be utilized as well as the pressure in causing the turbine to rotate at a very high speed. The shaft 14 which is being driven by the turbine may be utilized for any desired purpose where comparatively small power is needed but high speed required.

When the parts are adjusted to the position shown in Fig. 1 and the pump 1 is operating at its prescribed speed the efficiency of the power system is at its highest point. Where the valve member 22 is adjusted to cut out one turbine the speed of shaft 14 may be maintained by opening the by-pass an amount sufficient to by-pass the excess fluid but to maintain the pressure sufficient to overcome the torque load on the shaft. Where it is desired to reduce the speed of either of the turbines, or both of the turbines, this may be easily done by adjusting the valve member 22, namely, by turning the same for a short distance in a direction opposite to arrow 33. This will allow a certain amount of liquid to pass through the pressure return pipe 26 and, consequently, will deprive the pipes 3 and 4 of some of the liquid from chamber 18.

I claim:

1. A device for driving one or more shafts at high speed, including a pair of turbines, a pump for supplying liquid under pressure, tubular means including a valve casing for directing liquid from said pump to the inlet side of said turbines, tubular means for directing exhaust liquid from the turbines to the intake side of the pump, a valve positioned in said valve casing for controlling the volume of fluid to both of said turbines, said valve being formed with ports whereby said pump may furnish fluid to both of the turbines or to either of the turbines alone, and means connected to said valve casing presenting a by-pass for returning in connection with said valve any excess liquid to said pump.

2. A device for driving a shaft including a turbine connected with said shaft, a pump for supplying liquid under pressure, tubular means extending from the outlet side of said pump to the inlet side of said turbine, said tubular means including a valve casing having an inlet in the bottom from said pump and an outlet in one side, a by-pass extending from said casing to the inlet side of said pump, a valve member having a fully open bottom, an annular side wall with a plurality of ports and a closed top, said valve being rotatable so that when in one position all liquid flowing into the valve casing will pass to the inlet side of the turbine, when in a second position part of the liquid will flow to the turbine and part through said by-pass, and when in a third position all of the liquid will flow through the by-pass.

FREDERICK H. MESSINGER.